Aug. 22, 1961 W. MINNER 2,997,658

TUNED TRANSISTOR AMPLIFIER

Filed Feb. 5, 1959 2 Sheets-Sheet 1

Inventor:
Willy Minner
By [signature]
Patent Agent

INVENTOR
Willy Minner
BY George H Spencer
ATTORNEY

United States Patent Office
2,997,658
Patented Aug. 22, 1961

2,997,658
TUNED TRANSISTOR AMPLIFIER

Willy Minner, Ulm (Danube), Germany, assignor to Telefunken G.m.b.H., Berlin, Germany Filed Feb. 5, 1959, Ser. No. 791,297
Claims priority, application Germany Feb. 13, 1958
2 Claims. (Cl. 330—31)

The present invention relates to a circuit for eliminating the effect of the internal collector capacity of a transistor upon the resonant frequency of the output oscillatory circuit of a tuned transistor amplifier.

It has been known that the dynamic collector capacity C is dependent upon the size of the A.C. voltage appearing at the collector. In case of tuned transistor amplifiers, having a tuned oscillatory circuit in the collector loop, this dynamic capacity variation is especially troublesome, because the resonant frequency of the output circuit becomes dependent upon the size of the A.C. output voltage.

It is an object of the present invention to provide a circuit which obviates this undesirable effect.

It is a further object of the invention to insert a resistor between the collector and the oscillatory circuit, the value of said resistor being selected in such a way that the collector capacity which depends on the A.C. amplitude is transformed through this resistor to the oscillatory circuit in such a way that this capacity variation is of no influence to the resonance frequency of the oscillatory circuit.

Still further objects and the entire scope of applicability of the present invention will become apparent from the detailed description given hereinafter; it should be understood, however, that the detailed description and specific example, while indicating the preferred embodiment of the invention, is given by way of illustration only, since various changes and modifications within the spirit and scope of the invention will become apparent to those skilled in the art from this detailed description.

Figure 1:
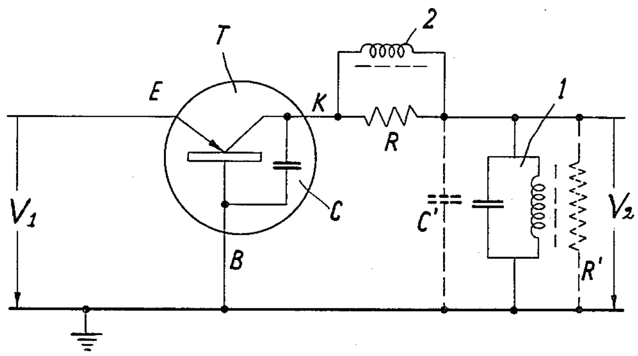
FIGURE 1 is a schematic embodiment of the inventive circuit.

In the circuit shown in FIGURE 1, a transistor T has an oscillatory circuit 1 connected to its collector K and forming with the transistor T a high frequency amplifier of the common base configuration, wherein the base electrode B is directly grounded. The input A.C. voltage $V_1$ is applied between emitter E and ground and the amplified output voltage $V_2$ appears across the oscillatory circuit 1. A resistor R is inserted between the collector electrode K and the oscillatory circuit 1. The collector capacity C between collector K and the base B has a value which is dependent upon the amplitude of the output voltage $V_2$. The resistor R is shunted by a choke 2 to pass the collector direct current.

With respect to the oscillatory circuit, the series circuit of C and R operates as a shunt circuit which can be considered as C′ and R′. If the reactance of C is large, i.e., small capacity with respect to the resistance R, a change in C will obviously result in a corresponding change of C′. If, however, the reactance of C is small with respect to the resistor R, a change in C will result in an inverse change of C′ (see "Lehrbuch der Funkempfangstechnik" by Helmut Pitsch, Akademische Verlagsgesellschaft, Leipzig, 1948, pp. 33 and 34). In the system according to the present invention, the operative range between these two limits is employed.

The optimum compensation resistance $R_{opt}$ can be calculated by $$R_{opt}=\sqrt{\frac{\frac{1}{\omega^2C_1}\left(\frac{1}{C_1}-\frac{1}{C_2}\right)}{\frac{C_2}{C_1}-1}}=\sqrt{\frac{1}{\omega^2C_1C_2}}$$

wherein $C_1$ represents the dynamic collector capacity at a very low amplitude of the voltage $V_2$, and $C_2$ represents the dynamic collector capacity C at a very high amplitude of the voltage $V_2$.

The improvement obtained by inserting the resistor R is shown by the following example. If the dynamic collector capacity C changes with the amplitude of the voltage $V_2$ from $C_1=2.5$ mmf. to $C_2=5$ mmf., the optimum resistance $R_{opt}$ has to equal 4150 Ω at a resonance frequency $f_0=10.7$ mc.

The effective capacity C′ in the oscillatory circuit 1 is $$C'=\frac{C}{1+\omega^2C^2R^2}$$

Figure 2:
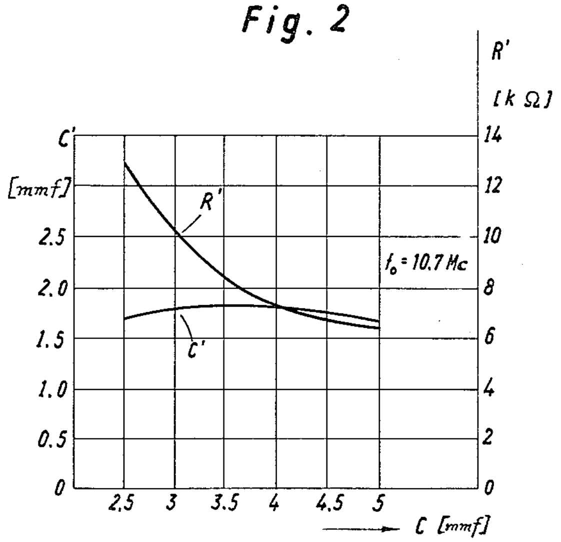
FIGURE 2 is a graph used in explaining the present invention.

In accordance with FIGURE 2, an effective capacity C′ is obtained between 1.69 mmf. and 1.79 mmf. FIGURE 2 also shows the real component of the shunt resistance R′ effective in the oscillatory circuit 1 in accordance with $$R'=R+\frac{1}{\omega^2C^2R}$$

The damping of the oscillating circuit 1 caused by the effective shunt resistance R′, which decreases with increasing C, is not damaging in many amplifying arrangements and is even desirable in intermediate frequency amplifiers of ultra short wave receivers, as it acts as an amplitude limiter. In practice, it has been found that the optimum condition is not always necessary for a satisfactory operation of the amplifier. A smaller resistor R may then be used and, thus, the choke 2 may be omitted.

The invention may be applied to emitter circuits.

Figure 3:
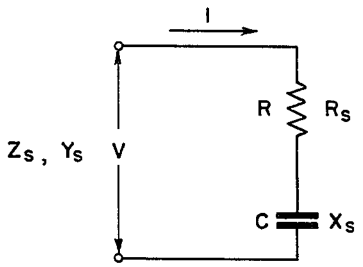
FIGURES 3 and 4 are circuit diagrams and FIGURE 5 is a graph referred to in the derivation of a formula.
Figure 4:
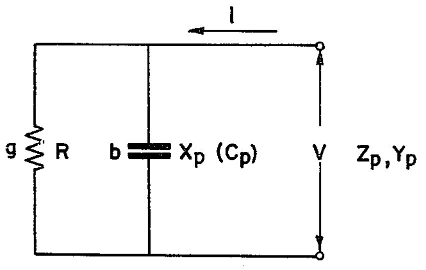

Before giving the derivation of the above-mentioned formula for $R_{opt}$, the following should be noted. The series circuit of FIGURE 3 may be changed into the equivalent parallel circuit of FIGURE 4, and the value $C_P$ be calculated as follows:

$$\frac{V}{I}=Z_S=R_s-jX_s$$

$$\frac{I}{V}=Y_S=\frac{1}{R-j\frac{1}{\omega C}}$$

$$\frac{I}{V}=Y_P=g+jb=\frac{1}{R_P}+j\frac{1}{X_P}=\frac{1}{R_P}+j\omega C_P$$

If $Y_S=Y_P$ $$\frac{1}{R-j\frac{1}{\omega C}}=\frac{1}{R_P}+j\omega C_P$$

or, upon rationalizing, $$\frac{R}{R^2+\left(\frac{1}{\omega C}\right)^2}+j\frac{\frac{1}{\omega C}}{R^2+\left(\frac{1}{\omega C}\right)^2}=\frac{1}{R_P}+j\omega C_P$$

Therefore, $$j\omega C_P = j\frac{\frac{1}{\omega C}}{R^2+\left(\frac{1}{\omega C}\right)^2}$$

$$\omega C_P = \frac{1}{\omega C\left(R^2+\left(\frac{1}{\omega C}\right)^2\right)} = \frac{1}{\omega CR^2+\frac{1}{\omega C}} = \frac{\omega C}{\omega^2C^2R^2+1}$$

$$C_P = \frac{C}{\omega^2C^2R^2+1} \quad (1)$$

Figure 5:
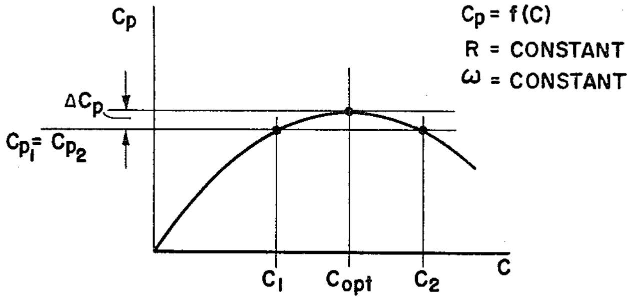

FIGURE 5 is a graph showing the value of $C_P$ as a function of C, with R and $\omega$ each being a constant. The maximum value of $C_P$ can then be obtained by calculating the differential $$\frac{dC_P}{dC}$$

and setting it equal to zero. Carrying out the differentiation, $$\frac{dC_P}{dC} = \frac{\omega^2C^2R^2+1-2\omega^2R^2C^2}{(\omega^2C^2R^2+1)^2}$$

The maximum $$\frac{dC_P}{dC}=0$$

is then obtained when $$\omega^2C^2R^2+1=2\omega^2R^2C^2$$
$$1=2\omega^2R^2C^2-\omega^2C^2R^2$$
$$1=\omega^2R^2C^2$$

For a given value of R, the following $C_{opt}$ is obtained:

$$C_{opt}=\sqrt{\frac{1}{\omega^2R^2}}=\frac{1}{\omega R}$$

Similarly, for a given value of C, the following $R_{opt}$ is obtained:

$$R_{opt}=\sqrt{\frac{1}{\omega^2C^2}}=\frac{1}{\omega C} \quad (2)$$

The significance of Equation 2, in conjunction with FIGURE 5 which shows $C_{opt}$, $C_1$, and $C_2$, is the following: For two serially connected capacitances $C_1$ and $C_2$, there is a series resistance $R_{opt}$ at which the two serially connected capacitances $C_1$ and $C_2$, when converted into a parallel circuit, are equal to each other. For series capacitances which lie between $C_1$ and $C_2$, changes in the converted capacitance $\Delta C_P$ are small because the function $C_P=f(C)$ passes through a maximum between $C_1$ and $C_2$. This optimum series resistance $R_{opt}$ can then be determined with the aid of Equation 1 and by making $C_{P_1}$ and $C_{P_2}$ equal to each other. Thus, if $$C_{P1}=\frac{C_1}{\omega^2C_1^2R^2+1}$$

and $$C_{P2}=\frac{C_2}{\omega^2C_2^2R^2+1}$$

then, by equating $C_{P_1}$ to $C_{P_2}$ $$\frac{C_1}{\omega^2C_1^2R^2+1}=\frac{C_2}{\omega^2C_2^2R^2+1}$$

R can be solved for, as follows:

$$C_1(\omega^2C_2^2R^2+1)=C_2(\omega^2C_1^2R^2+1)$$
$$\omega^2C_1C_2^2R^2+C_1=\omega^2C_1^2C_2R^2+C_2$$
$$\omega^2C_1C_2^2R^2-\omega^2C_1^2C_2R^2=C_2-C_1$$
$$R^2(\omega^2C_1C_2^2-\omega^2C_1^2C_2)=C_2-C_1$$
$$R^2=\frac{C_2-C_1}{\omega^2C_1C_2^2-\omega^2C_1^2C_2}=\frac{C_2-C_1}{\omega^2C_1(C_2^2-C_1C_2)}$$

$$R^2=\frac{\frac{1}{\omega^2C_1}(C_2-C_1)}{C_2^2-C_1C_2}\cdot\left(\frac{\frac{1}{C_1}}{\frac{1}{C_1}}\right)$$

$$R^2=\frac{\frac{1}{\omega^2C_1^2}(C_2-C_1)}{\frac{C_2^2}{C_1}-C_2}=\frac{\frac{C_2}{\omega^2C_1^2}-\frac{1}{\omega^2C_1}}{C_2\left(\frac{C_2}{C_1}-1\right)}$$

$$R^2=\frac{\frac{1}{\omega^2C_1^2}-\frac{1}{\omega^2C_1C_2}}{\frac{C_2}{C_1}-1}=\frac{\frac{1}{\omega^2C_1}\left(\frac{1}{C_1}-\frac{1}{C_2}\right)}{\frac{C_2}{C_1}-1}$$

Thus, $$R_{opt}=\sqrt{\frac{\frac{1}{\omega^2C_1}\left(\frac{1}{C_1}-\frac{1}{C_2}\right)}{\frac{C_2}{C_1}-1}} \quad (3)$$

Equation 3 can be simplified, as follows:

$$R_{opt}=\sqrt{\frac{\frac{1}{\omega^2C_1}\left(\frac{C_2-C_1}{C_1C_2}\right)}{\frac{C_2-C_1}{C_1}}}$$

$$=\sqrt{\frac{1}{\omega^2C_1}\cdot\frac{C_2-C_1}{C_1C_2}\cdot\frac{C_1}{C_2-C_1}}$$

$$=\sqrt{\frac{1}{\omega^2C_1}\cdot\frac{1}{C_2}}$$

$$R_{opt}=\sqrt{\frac{1}{\omega^2C_1C_2}} \quad (4)$$

Equation 4 shows that $R_{opt}$ is equal to the geometric mean between the capacitative reactances $$\frac{1}{\omega C_1}\text{ and }\frac{1}{\omega C_2}$$

I claim:

1. In an ultra short wave receiver intermediate frequency amplifier including a transistor having a collector and a base and connected in the common-base configuration and said amplifier including a resonant circuit in the collector loop, means for eliminating the effect on the resonant circuit of the collector-to-base internal capacity which varies with the A.C. output voltage of the transistor, comprising a resistor inserted in series between the collector and the resonant circuit and the value of the resistance being no greater than that selected according to the formula:

$$\sqrt{\frac{1}{\omega^2C_1C_2}}$$

where $\omega$ refers to the resonant frequency, $C_1$ is the internal capacity at low A.C. collector voltage and $C_2$ is the internal capacity at high A.C. collector voltage, whereby an effective component of said internal capacity appearing directly across the resonant frequency is substantially free of variation with changes in said A.C. output voltage.

2. In an amplifier as set forth in claim 1, a choke connected in shunt with said resistor and by-passing the D.C. collector current around the resistor.

References Cited in the file of this patent

UNITED STATES PATENTS

| | | |
|---|---|---|
| 1,713,130 | Jones | May 14, 1929 |
| 1,764,552 | Drake | June 17, 1930 |
| 1,775,181 | Arco | Sept. 9, 1930 |
| 2,691,074 | Eberhard | Oct. 5, 1954 |